(12) United States Patent
Menzel et al.

(10) Patent No.: US 8,078,390 B2
(45) Date of Patent: Dec. 13, 2011

(54) METHOD AND APPARATUS FOR TRANSMITTING VEHICLE-RELATED INFORMATION IN AND OUT OF A VEHICLE

(75) Inventors: Marc Menzel, Marburg (DE); Enno Kelling, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 352 days.

(21) Appl. No.: 12/305,461

(22) PCT Filed: Jun. 29, 2007

(86) PCT No.: PCT/EP2007/056577
§ 371 (c)(1),
(2), (4) Date: Dec. 18, 2008

(87) PCT Pub. No.: WO2008/000820
PCT Pub. Date: Jan. 3, 2008

(65) Prior Publication Data
US 2009/0287412 A1    Nov. 19, 2009

(30) Foreign Application Priority Data

Jun. 30, 2006  (DE) .......................... 10 2006 030 806
Jun. 29, 2007  (DE) .......................... 10 2007 030 430

(51) Int. Cl.
*G06F 19/00* (2011.01)
(52) U.S. Cl. .......... 701/117; 701/207; 340/991; 340/993
(58) Field of Classification Search .................. 701/207, 701/213, 300, 302, 117; 340/988, 933, 438, 340/991
See application file for complete search history.

(56) References Cited

U.S. PATENT DOCUMENTS

| | | | | |
|---|---|---|---|---|
| 5,589,827 | A * | 12/1996 | Scurati | 340/901 |
| 2001/0004232 | A1 * | 6/2001 | Sakamoto et al. | 340/425.5 |
| 2002/0105481 | A1 * | 8/2002 | Kanevsky et al. | 345/7 |
| 2002/0119791 | A1 * | 8/2002 | Bai | 455/456 |
| 2004/0210371 | A1 * | 10/2004 | Adachi et al. | 701/50 |
| 2004/0233045 | A1 * | 11/2004 | Mays | 340/425.5 |
| 2005/0235198 | A1 * | 10/2005 | Howard et al. | 715/500.1 |
| 2006/0089793 | A1 * | 4/2006 | Rudow et al. | 701/208 |
| 2006/0095195 | A1 * | 5/2006 | Nishimura et al. | 701/96 |

FOREIGN PATENT DOCUMENTS

| | | |
|---|---|---|
| DE | 10 2004 036 564 A1 | 3/2003 |
| DE | 20204697 U1 * | 8/2003 |
| DE | 202 04 697 U1 | 9/2003 |
| DE | 600 10 080 T2 | 11/2004 |
| DE | 10 2004 005 152 A1 | 8/2005 |
| DE | 102004005152 A1 * | 8/2005 |

(Continued)

*Primary Examiner* — Thomas Black
*Assistant Examiner* — Shardul Patel
(74) *Attorney, Agent, or Firm* — RatnerPrestia

(57) ABSTRACT

A method for transmitting vehicle-related information in and out of a vehicle and an apparatus for carrying out the method are disclosed. The method includes the steps of (i) receiving location information via reception means for position finding, (ii) evaluating vehicle-related information and location information via means for coordinating an interaction between the communication means, the reception means and means for wireless radio networking, (iii) transmitting vehicle-related information and the location information to mobile terminals carried in the vehicle by wireless radio networking comprising one bi-directional communication link, and (iv) indicating the vehicle-related information and location information audibly, visually, haptically, or any combination thereof, within a reproduction unit in the mobile terminals.

13 Claims, 2 Drawing Sheets

FOREIGN PATENT DOCUMENTS

| | | | |
|---|---|---|---|
| DE | WO2005/075940 A1 * | 8/2005 | |
| DE | WO2005075940 A1 * | 8/2005 | |
| DE | 10 2004 050 710 A1 | 4/2006 | |
| DE | 102004050710 A1 * | 4/2006 | |
| DE | 10 2005 048 133 A1 | 5/2006 | |
| WO | WO 00/74019 A1 | 12/2000 | |

* cited by examiner

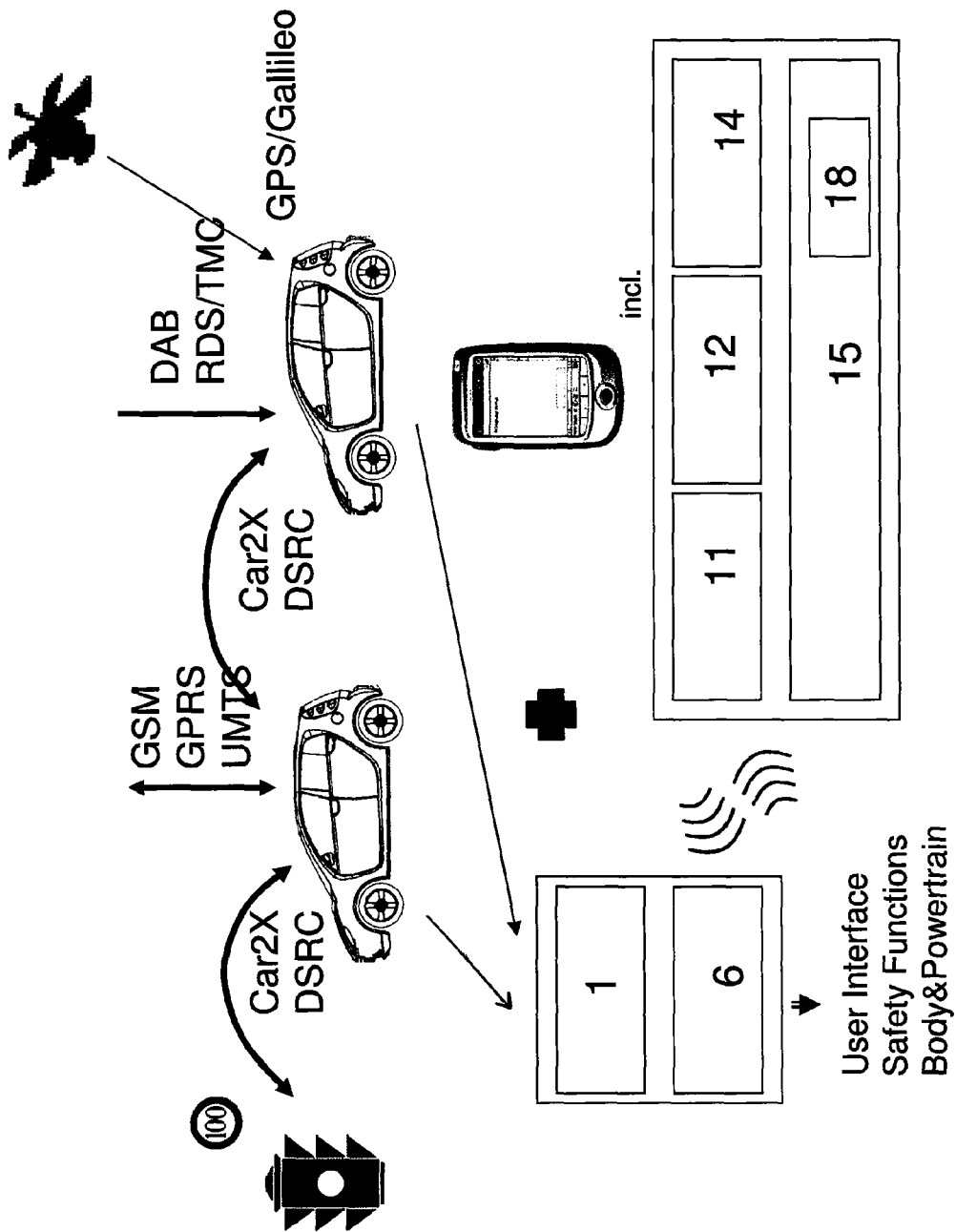

METHOD AND APPARATUS FOR TRANSMITTING VEHICLE-RELATED INFORMATION IN AND OUT OF A VEHICLE

CROSS REFERENCE TO RELATED APPLICATIONS

This application is the U.S. national phase application of PCT International Application No. PCT/EP2007/056577, filed Jun. 29, 2007, which claims priority to German Patent Application No. DE102006030806.9, filed Jun. 30, 2006 and German Patent Application No. DE102007030430.9, filed Jun. 29, 2007, the contents of such applications being incorporated by reference herein.

BACKGROUND OF THE INVENTION

1. Field of the Invention

The invention relates to a method and an apparatus which is suitable for use in a vehicle for transmitting vehicle-related information in and out of a vehicle.

2. Description of the Related Art

EP 1 150 098 A1 discloses a vehicle navigation system having a plurality of units which are coupled to one another. The units comprise an input/output unit, a route planning unit and a position finding unit. The navigation system is designed to determine a route between a starting point and a destination taking account of possible intermediate destinations, which hotels, for example, or else traffic information, which can be requested using the radio data system (RDS), for example. In addition, the navigation system also comprises a database with data about the distances between prescribed road sections, the associated probable journey time therefor and a road classifications. Furthermore, the navigation system also comprises a logbook computer which stores schedules from the past, accrued invoices or other costs. Depending on the information in the database, in the logbook computer and also depending on the RDS system, the navigation system is designed to ascertain the respective route from the starting point to the destination. The individual components of the navigation system may be coupled to one another by means of Bluetooth interfaces or else by means of GSM interfaces.

The English abstract JP 2003-130669-A likewise discloses a navigation system for vehicles which comprises a route planning and processing unit and an alternative route calculation unit. The route planning and processing unit is designed to ascertain a route to a set destination position. It is also designed to allocate route information on the basis of costs which are associated with the respective road sections of the respective route. Such costs are disclosed as a highway or toll road.

DE 19640735 propose a telematics appliance which contains a car radio with an RDS module, a radio telephone, a position finding and navigation system in a housing. The housing is designed such that it can be fitted into the standardized slot on the dashboard of a motor vehicle. The telematics appliance can be used to receive both generally relevant information via the car radio and individual information via the GSM module. In addition, data about the vehicle position, a desired destination or an emergency call, for example, can be sent to the control center. The control center calculates one or more destination routes and returns them to the telematics appliance. In the case of an accident or a breakdown, an appropriate emergency call is sent and help is fetched.

To further improve the safety individual mobility, it is also necessary to use external information sources in addition to the information sources which can be fitted into a vehicle. This allows a more extensive picture of the environment to be obtained, since visual obstructions are not a disturbance and it is possible for more extensive information to be interchanged. Mobile radio technology interacting with further methods allows information to be interchanged from vehicle to vehicle and from vehicle to infrastructure.

The necessary cross-manufacturer standardization of radio technology and protocols is currently being advanced in the Car2Car communication consortium (C2C CC). Besides the interchange of information over short distances, it is additionally also always necessary to interchange data with a central infrastructure, for example in order to be able to send emergency calls or for example in order to recover stolen vehicles. To this end, use is usually made of radio telephone modules (GSM/UMTS) and satellite positioning systems (GPS/Galileo). To get an improved picture of the vehicle environment, not only these communication devices but also information about the environment are necessary, i.e. a map of the environment is required for a large number of progressive functions. This map information, as is used in navigation systems, for example, is a very expensive component of a telematics system, however, on account of its volume and the need to keep it up to date.

It is therefore an object of the invention to provide a method and an apparatus for transmitting vehicle-related information which can be used easily, inexpensively and flexibly in vehicles.

SUMMARY OF THE INVENTION

Referring to FIGS. 1 and 2, in one advantageous embodiment, the communication means (1), (2), (6) are used to receive and send vehicle-related information, and reception means for position finding (4) are used to receive location information, vehicle-related information and location information is evaluated using means for coordinating the interaction (5), and vehicle-related information and the location information is transmitted to mobile terminals carried in the vehicle by means of wireless radio networking (7) such that the vehicle-related information and location information is indicated and interacted audibly and/or visually and/or haptically within a reproduction unit in the mobile terminals, the wireless radio networking being at least one bi-directional radio communication link.

With particular advantage, one method step, according to aspects of the invention, is used to check whether communication means (1), (2), (6), reception means for position finding (4) and means for coordinating the interaction (5) are situated on a computer platform, which are fitted in the vehicle, and are able to be activated, and a further method step is used to check whether the communication means (11), (12), (16), the reception means for the position finding (14) and means for coordinating the interaction (5) are situated on the mobile terminals carried in the vehicle and, if communication means (1), (2), (11), (12), reception means for position finding (4), (14) and means for coordinating the interaction (5), (15) are present in the vehicle and on the terminals, those in the vehicle are activated and the components which are not present in the vehicle are activated on the mobile terminal.

In a further refinement, navigation systems are executed on the mobile terminals, and the reception means for position finding present the location information in the navigation systems.

In a further refinement of the invention, the presentation in the navigation systems is in 2-dimensional form and/or 3-dimensional form.

Particularly advantageously, the reception means for position finding (4), (14) process the satellite-assisted information from satellite systems GLOSNASS and/or GPS and/or COMPASS and/or Galileo and/or IRNSS and/or EGNOS and/or GAGAN and/or MEAS and/or WASS.

In a further advantageous refinement of the invention, the wireless radio networking is effected by means of local area communication. It is particularly advantageous that the local area communication using Bluetooth and/or Ultra Wide Band (UWB) technology.

A particular advantage is the refinement of the method, according to aspects of the invention, in which communication the communication means (1), (11) are used for radio and satellite communication, the communication means (2), (12) are used for WLAN/DSRC and/or communication, and communication means (6) are used for data bus communication via CAN and/or Flexray and/or MOST, the communication means (1), (11), (2), (12) being activated in the vehicle when criteria are met.

In a further advantageous refinement, the means for coordinating the interaction (5) are in the form of a telematics control unit which is implemented in the vehicle or on the terminals.

To carry out the method, a particularly advantageous apparatus which comprises communication means for communication via mobile radio and satellite radio networks (1) and wireless local area radio networks (2) and vehicle field buses (6), and reception means for position finding information via satellites (4) and means for coordinating (5) the interaction between the communication means (1), (2), (6), the reception means (2) and means for wireless radio networking (3) of mobile terminals carried in the vehicle.

One advantageous refinement provides the a computer program having program code means when the computer program is executed on a computer, a smart phone, an MDA, PDA or a corresponding computation unit, particularly an electronic computation unit in an apparatus, wherein the what is known as an update functionality allows the computer program to be transmitted and executed via the communication means (1) and/or (2) the computation unit in the vehicle and/or terminals.

One refinement provides the a computer program product having program code means which are stored on a computer-readable data storage medium in order to perform all the steps of a method when the computer program is executed on a computer or a corresponding computation unit, a smart phone, an MDA, PDA or a corresponding computation unit, particularly an electronic computation unit in an apparatus.

The apparatus is also designed to request information about the environment for the situation prevailing on the road, such as what vehicles are in the closest vicinity. This advantageously allows the entire periphery of the vehicle to be taken into account. The peripheral information is provided using very little complexity in the apparatus.

In one advantageous refinement of the apparatus, it is designed to simultaneously preselect one or more possible mobile radio networks such as UMTS, GPRS, GSM, what are known as the 2G, 2.5G, 3G or 4G or satellite communication networks, in order to activate various added-value services, such as DVB-T, from the vehicle. This allows additional information to be accessed, by way of example, from the internet and/or portals of various providers, known as service providers (SP).

In line with another advantageous refinement of the apparatus, it is also designed to automatically receive position finding data via satellite using a suitable receiver, such as a GPS receiver.

In line with another advantageous refinement of the apparatus, it is designed to output information via wireless radio networking to a mobile terminal, such as the indication of the current route between the prescribed starting point and the prescribed destination, which is ascertained by the apparatus and indicated on the mobile terminal.

A particular advantage is the modular design of the apparatus and the access to the modules during the method cycle, since this allows customized configuration to be performed without any additional hardware complexity and allows optimization to suit the available communication channels.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures:

FIG. 2 shows an overview of the apparatus according to the invention with a mobile TCU.

DETAILED DESCRIPTION OF THE PREFERRED EMBODIMENTS

Figure 1:
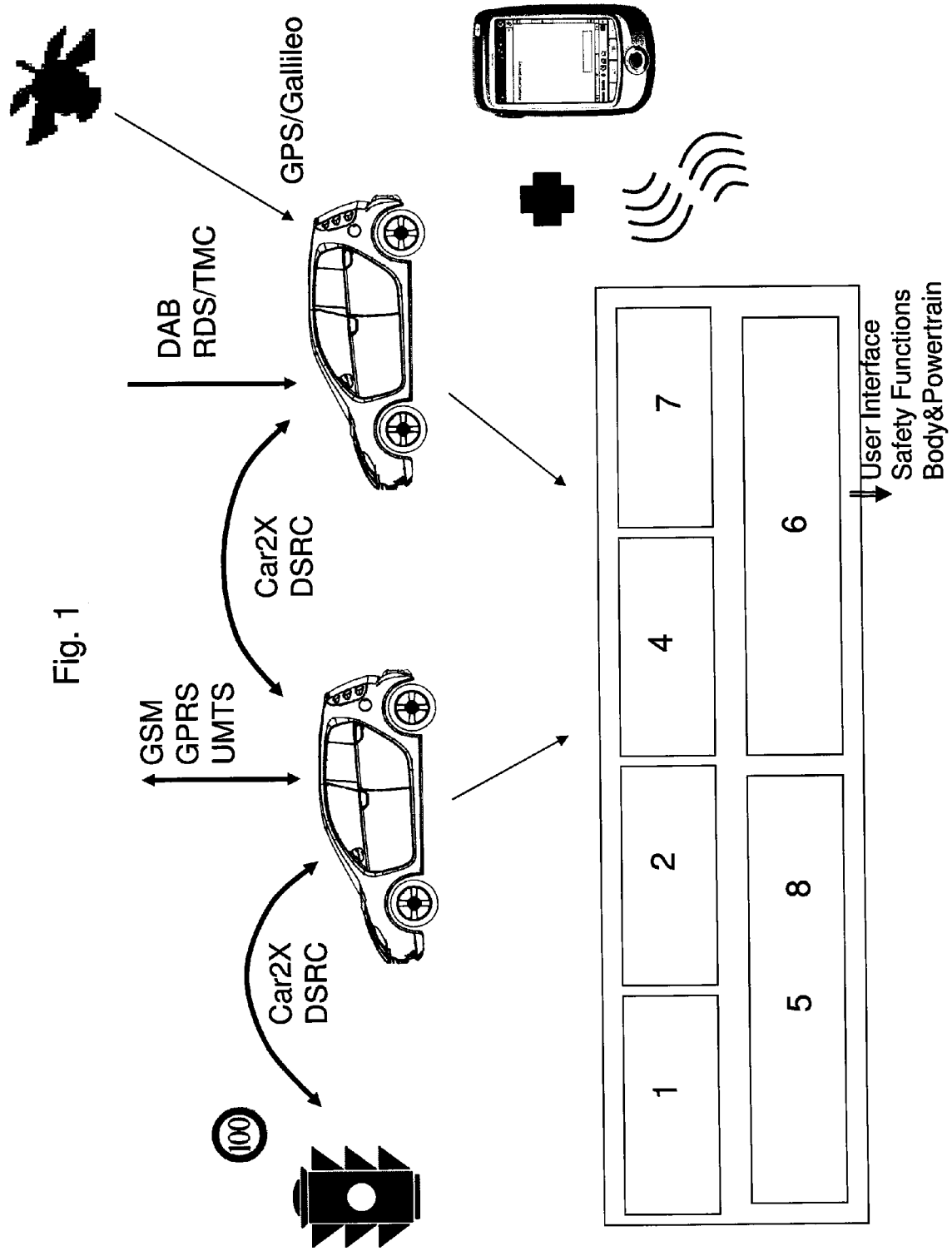
FIG. 1 shows a possible structure of the apparatus according to the invention.

In line with the invention, the vehicle is equipped with vehicle assistance and vehicle safety systems. The vehicle safety systems which may be used are any braking systems with electronic control which are available in the vehicle. Vehicle safety systems may be the electronic brake system (EBS), the engine management system (EMS), antilock system, traction control system, electronic stability program, electronic differential lock, transmission control unit (TCU), electronic brake force distribution (EBV) and/or engine braking regulation (MSR), electrically controllable steering systems (ASF, EPS).

Driver assistance systems are electronic supplementary devices in vehicles to assist the driver in particular driving situations. Often, safety aspects are of primary importance in this context, but so is increasing the driving comfort. These systems semiautonomously or autonomously influence drive, control (e.g. acceleration, braking, steering) or signaling devices in the vehicle or use suitable man-machine interfaces to warn the driver shortly before or during critical situations. Examples of such driver assistance systems are parking aids (sensor arrays for obstacle and distance recognition), brake assist system (BAS), Tempomat, Adaptive Cruise Control (ACC), distance control, turning assistance, tailback assistance, lane recognition system, tracking assistance/lane assistance (lateral guidance support, lane departure warning (LDW)), tracking support (lane keeping support), lane change assistance, lane change support, intelligent speed adaptation (ISA), adaptive bend light, tire pressure control system, driver state recognition, traffic sign recognition, platooning, automatic emergency braking (ANB), full/dipped beam assistance for headlights, night vision system.

The integration of various systems retains all the functional advantages of the individual subsystems and additionally increases the overall power thereof. While the individual subsystems can reduce accidents, for example, by minimizing the risk of certain dangers which apply only to the driver's own vehicle, the invention allows complex dangerous situations to be resolved which involve numerous vehicles, in particular. In addition, risks in connection with vehicle collision, for example, are reduced because it does not just concentrate on certain cases, such as avoiding rear-end collisions.

The sequence of the method according to aspects of the invention is made up of the following phases:
1. Ascertainment of the modules in the vehicle.
2. Receipt and update of the information from the adjacent vehicles and the environment.
3. Output of the location information for the navigation system
4. Interaction with the systems in the vehicle by means of multimodal access using mobile terminals
1. Ascertainment of the Systems in the Vehicle The driver assistance system and vehicle safety systems in the vehicle are activated and communicate via a data bus (6), such as the CAN bus. In addition, the wireless radio networking (7) is activated by mobile terminals in the vehicle. The wireless radio networking is active as what is known as a master. Upon recognition of a mobile terminals which is ready for wireless radio networking, which can perform Bluetooth communication and which, by way of example, is in the form of a smart phone, a mobile digital assistant (MDA), a personal digital assistant (PDA) or a computer unit in the form of a laptop, and when a navigation system executed on this mobile terminal, a check is performed to determine whether the modules, such as the communication means (1), (2), reception means for position finding (4) for location information and the means for coordinating the interaction (5) are available on the mobile terminal or in the vehicle and can be used.

In one refinement of the method according to aspects of the invention, the communication means (1) provided is a telephone function for the mobile radio networks and satellite radio networks for transmitting voice and data. The communication means (2) is used for vehicle-to-vehicle communication and/or for vehicle-to-infrastructure communication, which is used to ascertain and interchange information with the environment, for example using DSRC or WLAN. The data ascertained by means of DSRC and/or WLAN are evaluated and analyzed by means for coordinating the interaction (5). The means for coordinating the interaction are in the vehicle in the form of a telematics control unit (TCU). In one embodiment, this TCU comprises the communication means (1), (2) which, in terms of function, contains the components which are required for basic telematics functions such as emergency calls, vehicle tracking and vehicle-to-vehicle communication or vehicle-to-infrastructure communication, and is then additionally equipped with a module for wireless radio networking in order to incorporate mobile appliances, such as a mobile terminal with a navigation system. In line with the invention, mobile transmission protocols are used to this end, such as Bluetooth.

In another embodiment, the TCU is in the form of an individual module which performs permanent data interchange with the communication means (1) and (2) via the data bus (6).

On the basis of the recognition, a check is then performed to determine which modules need to be activated in the vehicle or on the terminals for the purpose of handling the communication. The one simple refinement as prescribed in FIG. 2, all modules on the terminals need to be activated, since the configuration in the vehicle means that no communication means are found which allow information to be interchanged with the environment. In this embodiment, the communication is performed by means of the terminal and the functions which are in the terminal.

The ascertained configuration of the modules then determines the profile of the vehicle's "communication ability". The evaluation of the vehicle-related information and the location information by means of wireless radio networking (7) on mobile terminals carried in the vehicle is transmitted such that the vehicle-related information and location information is indicated and interacted audibly and/or visually and/or haptically within a reproduction unit on the mobile terminals, the wireless radio networking being effected at least one bi-directional communication link.

In one advantageous embodiment, if the modules are identified as being present more than once the method according to aspects of the invention is used to activate them according to criteria which are determined by the implementation of the intended applications.

Examples of such criteria are the bandwidth which can be used by the communication means. To this end, one method step involves the bandwidth available via the communication means being checked in the vehicle and on the terminals, and the side with the higher bandwidth is then activated. The invention entertains the idea of pooling the communication means so that a maximum bandwidth is available and the TCU performs the information management.

One idea is to allow bandwidth reservation for safety-critical applications, for example using the communication means (2). If the respective module in the vehicle and/or in the terminal does not observe this "minimum bandwidth" then the other one is activated. If the other module is likewise unable to "process" the reserved bandwidth, it is likewise not activated. Examples of further criteria are the total available computation power and hence the resultant computation and signal delay time.

In addition, one idea is for at least two terminals to be able to participate in the network which has been set up, the terminal allocation advantageously having 3-bit to 8-bit addressing. All nonactive mobile terminals will keep the synchronization in parking mode and be activated in the network upon request.

The resultant Piconetwork comprises wireless radio networking (7), which corresponds to what is known as a master, this master (7), in line with the invention, always being present in the vehicle and coordinating up to seven further mobile terminals, what are known as subscribers (slaves). The master controls the communication and allocates transmission slots to the slaves.

The invention involves two different physical data channels being provided for the radio networking (7). The synchronous data transmission is intended for the purpose of transmitting audio data, specifically voice data at a data rate of 64 Kbit/s. The other form of transmission is packet switching or asynchronous connection, which presupposes a storage behavior by the transmission appliance. The method, according to aspects of the invention, supports an asymmetric data channel or a symmetric data link in both directions. If no synchronous data packets are being sent, asynchronous transmission is performed. This is used to handle all services, both the sending of useful data packets and the transmission of control information, between the wireless radio networking (6) and the mobile terminal (8).

The wireless radio networking (7) for example using Bluetooth is thus used as a universal interface. This connection is used firstly to handle all presentation and input functions of the TCU (5) which, in one embodiment, are classified as non-safety-critical, and furthermore the TCU is also provided with map information from the mobile appliance, as shown in FIG. 1.

The embodiment described previously can also be advantageously altered by now installing only a Bluetooth interface (5) in the vehicle which provides mobile terminals (8) with vehicle information, all other components which are necessary for telematics services being integrated in a mobile terminal which then performs the relevant functions.

The advantage is in the costs which are incurred for the vehicle manufacture, as a result of which it would be possible to achieve very rapid permeation of the stock of vehicles. The invention entertains the idea of performing only together with the mobile terminal and of performing safety-related functions, resorting to an alternative data transmission to Bluetooth data transmission for the local area which ensures a connection for reliable communication.

2. Receipt and Update of the Information from the Adjacent Vehicles and the Environment The environment sensor system senses the objects in the immediate environment, such as vehicles, traffic signs or obstacles, and the information is made available to the TCU (5) via the vehicle bus (6). The TCU (5) then takes account of the location information received by means of reception means for position finding (4) to instruct the communication means (1) and (2) to send and receive the information required for the respective application via the relevant transmission channel using the communication means.

In line with the invention, this results in advantages such as the provision of a cheap TCU which is fitted for vehicles in the mass market, for example, which allows a high level extensive use of the vehicle-to-vehicle technology.

In addition, the use of a mobile appliance with graphical user guidance allows intuitive operation and attractive presentation of the respective application by the appropriately designed man-machine interface and of the telematics functions. Furthermore, map information from the mobile appliance can be used to allow more reliable telematics functions. For the mobile navigation system, there is additionally also the advantage that it can be provided with vehicle information which allows better navigation, said vehicle information being able to be obtained by bridging GPS radio holes, for example, since it is possible to access alternative position finding methods using the communication means (6). In this case, the evaluation of the rotation rate sensors and of the yaw sensor, for example, by the vehicle is used to perform position finding without accessing "external" information sources via the communication means (1), (2).

3. Output of the Location Information to the Navigation System

All the relevant information is presented to the navigation system executed in the mobile terminal on the basis of the application. The output is effected multimodally, i.e. the location information is visually displayed, the geographical coordinates, for example, are audibly output and/or haptic signaling is provided in the event of a potential danger.

4. Interaction with the Systems in the Vehicle by Means of Multimodal Access Using Mobile Terminals Provision is also made for interactive access to request additional information on the reproduction unit, which information is ascertained using the environment sensing and the communication means and is presented in the form of what are known as metadata. A cited example is that, by way of example, when, passing a point of interest (POI) which can perform vehicle-to-infrastructure communication, when requesting additional information which is requested via the mobile terminal and is output by means of the latter.

In addition, a security module (8), (18) which is incorporated in the TCU (5), (15) can be used to form the communication and the interchange of data in a secure form. In this context, secure form should be interpreted as storage and monitoring of the information to be transmitted and received which fends off an attack on the information and data from the outside, such as tapping and does not permit access by third parties. A form of encrypted transmission can take place using what is known as SSL encryption.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for transmitting vehicle-related information in and out of a vehicle via a communication means, said method comprising the steps of:
   receiving location information via reception means for position finding,
   evaluating vehicle-related information and location information via means for coordinating an interaction between the communication means, the reception means and means for wireless radio networking,
   transmitting vehicle-related information and the location information to mobile terminals carried in the vehicle by wireless radio networking comprising one bi-directional communication link,
   indicating the vehicle-related information and location information audibly, visually, haptically, or any combination thereof, within a reproduction unit in the mobile terminals,
   ascertaining whether communication means, reception means for position finding and means for coordinating are situated on a computer platform that is positioned in the vehicle and are able to be activated,
   ascertaining whether the communication means, the reception means for the position finding and means for coordinating the interaction are situated on the mobile terminals carried in the vehicle,
   activating the communication means, the reception means for position finding and means for coordinating the interaction that are present in the vehicle, and
   activating the communication means, the reception means for position finding and means for coordinating the interaction on the mobile terminal that are not present in the vehicle on the mobile terminal.

2. The method as claimed in claim 1 further comprising the steps of executing a navigation system on the mobile terminals, presenting the location information in the navigation systems via the reception means for position finding.

3. The method as claimed in claim 2, wherein a presentation in the navigation systems is in 4-dimensional form, 3-dimensional form or both 2-dimensional form and 3-dimensional form.

4. The method as claimed in claim 1, wherein the reception means for position finding process satellite-assisted information from satellite systems GLOSNASS, GPS, COMPASS, Galileo, IRNSS, EGNOS, GAGAN, MEAS, WASS or any combination thereof.

5. The method as claimed in claim 1, wherein the wireless radio networking is effected by means of local area communication.

6. The method as claimed in claim 5, wherein the local area communication is effected by means of Bluetooth.

7. The method as claimed in claim 1, wherein the communication means are used for (i) mobile radio communication, (ii) DSRC communication, and (iii) data bus communication via CAN, Flexray, MOST, or any combination thereof.

8. The method as claimed in claim 1 further comprising the step of activating the communication means in the vehicle when criteria are met.

9. The method as claimed in claim 1, wherein means for coordinating the interaction is a telematics control unit which is implemented in the vehicle or on the terminals.

10. An apparatus for carrying out the method as claimed in claim 1, wherein the apparatus comprises communication means for communication via mobile radio networks and wireless local area radio networks and vehicle field buses, and reception means for position finding information via satellites and means for coordinating the interaction between the communication means the reception means and means for wireless radio networking of mobile terminals carried in the vehicle.

11. A computer program having program code means in order to perform all of the steps of the method as claimed in claim 1 when the computer program is executed on a computer, a smart phone, an MDA, a PDA, a corresponding computation unit or a telemetics control unit.

12. A computer program product having program code means which are stored on a computer-readable data storage medium in order to perform all the steps of a method as claimed in claim 1 when the computer program is executed on a computer or a corresponding computation unit, a smart phone, an MDA, a PDA, a corresponding computation unit or a telemetics control unit.

13. The method as claimed in claim 1 wherein the information related to driver assistance systems and/or vehicle safety systems includes vehicle-to-vehicle communication and/or vehicle-to-infrastructure communication.

* * * * *